United States Patent
Phoha et al.

(10) Patent No.: US 7,620,819 B2
(45) Date of Patent: Nov. 17, 2009

(54) SYSTEM AND METHOD FOR CLASSIFYING REGIONS OF KEYSTROKE DENSITY WITH A NEURAL NETWORK

(75) Inventors: Vir V. Phoha, Ruston, LA (US); Sunil Babu, Shreveport, LA (US); Asok Ray, State College, PA (US); Shashi P. Phoba, State College, PA (US)

(73) Assignees: The Penn State Research Foundation, University Park, PA (US); Louisiana Tech University Foundation, Inc., Ruston, LA (US)

( * ) Notice: Subject to any disclaimer, the term of this patent is extended or adjusted under 35 U.S.C. 154(b) by 738 days.

(21) Appl. No.: 11/241,103

(22) Filed: Sep. 29, 2005

(65) Prior Publication Data

US 2007/0245151 A1    Oct. 18, 2007

Related U.S. Application Data (60) Provisional application No. 60/615,735, filed on Oct. 4, 2004.

(51) Int. Cl.
 *G06F 21/00*    (2006.01)
(52) U.S. Cl. ............... 713/186; 382/115; 706/6; 706/15; 706/16; 706/25; 706/33; 706/34; 706/35; 706/36; 706/37; 706/38; 706/39; 706/40; 706/41; 706/42; 706/43; 706/44
(58) Field of Classification Search ............ 706/6, 706/15, 16, 25, 33–44; 382/115; 713/186
See application file for complete search history.

(56) References Cited

U.S. PATENT DOCUMENTS

| | | | |
|---|---|---|---|
| 3,993,976 A | 11/1976 | Ginsburg | |
| 4,197,524 A | 4/1980 | Salem | |
| 4,455,588 A | 6/1984 | Mochida et al. | |
| 4,499,462 A | 2/1985 | Stoesser et al. | |
| 4,621,334 A | 11/1986 | Garcia | |
| 4,805,222 A | 2/1989 | Young et al. | |
| 5,060,263 A | 10/1991 | Bosen et al. | |
| 5,161,245 A | 11/1992 | Fenwick | |

(Continued)

FOREIGN PATENT DOCUMENTS

EP    1251468    10/2002

(Continued)

OTHER PUBLICATIONS

BioPassword Technical Report, BioPassword Keystroke Dynamics, Oct. 2001, pp. 1-9.

(Continued)

*Primary Examiner*—Carl Colin
*Assistant Examiner*—Kevin Richards
(74) *Attorney, Agent, or Firm*—Blakely Sokoloff Taylor & Zafman LLP (57) ABSTRACT

We develop a system consisting of a neural architecture resulting in classifying regions corresponding to users' keystroke patterns. We extend the adaptation properties to classification phase resulting in learning of changes over time. Classification results on login attempts of 43 users (216 valid, 657 impersonation samples) show considerable improvements over existing methods.

18 Claims, 7 Drawing Sheets

U.S. PATENT DOCUMENTS

| | | | |
|---|---|---|---|
| 5,181,238 A | | 1/1993 | Medamana et al. |
| 5,222,195 A * | | 6/1993 | Alkon et al. ............ 706/25 |
| 5,276,769 A * | | 1/1994 | Ueda et al. ............ 706/25 |
| 5,371,809 A * | | 12/1994 | Desieno ............ 382/159 |
| 5,544,255 A | | 8/1996 | Smithies et al. |
| 5,557,686 A | | 9/1996 | Brown et al. |
| 5,675,497 A | | 10/1997 | Petsche et al. |
| 5,764,889 A | | 6/1998 | Ault et al. |
| 5,793,952 A | | 8/1998 | Limsico |
| 5,802,507 A | | 9/1998 | Gentric et al. |
| 5,910,989 A | | 6/1999 | Naccache |
| 5,930,804 A | | 7/1999 | Yu et al. |
| 6,062,474 A | | 5/2000 | Kroll |
| 6,070,159 A | | 5/2000 | Wilson et al. |
| 6,151,593 A | | 11/2000 | Cho et al. |
| 6,167,439 A | | 12/2000 | Levine et al. |
| 6,272,479 B1 | | 8/2001 | Farry et al. |
| 6,307,955 B1 | | 10/2001 | Zank et al. |
| 6,334,121 B1 | | 12/2001 | Primeaux et al. |
| 6,405,922 B1 | | 6/2002 | Kroll |
| 6,421,450 B2 | | 7/2002 | Nakano |
| 6,513,018 B1 | | 1/2003 | Culhane |
| 6,597,775 B2 | | 7/2003 | Lawyer et al. |
| 6,839,682 B1 | | 1/2005 | Blume et al. |
| 6,850,606 B2 | | 2/2005 | Lawyer et al. |
| 6,865,566 B2 | | 3/2005 | Serrano-Morales et al. |
| 6,903,723 B1 | | 6/2005 | Forest |
| 6,944,604 B1 | | 9/2005 | Majoor |
| 6,965,889 B2 | | 11/2005 | Serrano-Morales et al. |
| 6,968,328 B1 | | 11/2005 | Kintzer et al. |
| 6,993,514 B2 | | 1/2006 | Majoor |
| 7,246,243 B2 | | 7/2007 | Uchida |
| 2001/0036297 A1 | | 11/2001 | Ikegami et al. |
| 2002/0171603 A1* | | 11/2002 | Chen et al. ............ 345/1.1 |
| 2004/0005995 A1 | | 1/2004 | Edelson |
| 2004/0034788 A1 | | 2/2004 | Ross |
| 2004/0103296 A1 | | 5/2004 | Harp et al. |
| 2004/0162999 A1 | | 8/2004 | Schreiber et al. |
| 2004/0187037 A1 | | 9/2004 | Checco |
| 2005/0008148 A1 | | 1/2005 | Jacobson |
| 2005/0058324 A1 | | 3/2005 | Karhik |
| 2005/0149463 A1* | | 7/2005 | Bolt et al. ............ 706/20 |
| 2006/0136744 A1 | | 6/2006 | Lange |
| 2006/0222210 A1 | | 10/2006 | Sundaram |
| 2007/0009140 A1 | | 1/2007 | Jitsui et al. |
| 2007/0245151 A1 | | 10/2007 | Phoha et al. |

FOREIGN PATENT DOCUMENTS

| | | |
|---|---|---|
| JP | 11253426 | 9/1999 |
| JP | 11306351 | 11/1999 |

OTHER PUBLICATIONS

Umphress, D., et al., "Identity Verification Through Keyboard Characteristics", Int'l. Journal of Man-Machine Studies (1985) 23(3): 263-273.

Leggett, et al., "Verifying Identity via Keystroke Characteristics", Intl. Journal of Man-Machine Studies, (1988) 28(1): 67-76.

M. Brown, et al., "User Identification via Keystroke Characteristics of Typed Names Using Neural Networks", Int'l. Journal of man-Machine Studies (1993) 39(6): 999-1014.

Monrose, et al., "Authentication via Keystroke Dynamics", Proc. of the ACM Workshop, ACM Conference on Computer Communications Security (1997) pp. 48-56.

Robinson, et al., "Computer User Verification Using Login String Keystroke Dynamics", IEEE Transactions on Systems, Man, and Cypernetics—Part A: Systems and Humans (Mar. 1998) vol. 28, No. 2, pp. 236-241.

Bleha, et al., "Computer-Access Security Systems Using Keystroke Dynamics", IEEE Transactions on Pattern Analysis and Machine Intelligence (Dec. 1990) 12(12): 1217-1222.

The Penn State Research Foundation, "PCT notification of transmittal of international search report and written opinion of the international search authority," dated May 17, 2007, PCT/US05/35219, filed Sep. 30, 2005.

R. Gaines, et al., "Authentication by Keystroke Timing: Some Preliminary Results", Rand Report R-256-NSF, Rand Corporation, 1980.

Jain, A.K., et al., "Artificial Neural Networks: A Tutorial," Computer, 29(3):31-44, Mar. 1996.

Lippmann, R., "An Introduction to Computing with Neural Nets," ASSP Magazine, 4(2):4-22, Apr. 1987.

Monrose, F., et al., "Keystroke dynamics as a biometric for authentication," Future Generation Computer Systems, 16(2000):351-359, Mar. 1999.

Sheng, Y., et al., "A parallel decision tree-based method for user authentication based on keystroke patterns," IEEE Transactions on Systems, Man and Cybernetics—Part B: Cybernetcs, 35(4):826-833, Aug. 2005.

Biopassword, "Technical Report. BioPassword Keystroke Dynamics", http://web.archive.org/web/20040807231; http://www.biopassword.com/home/technology/BP%204.5%20Technical%20Paper.pdf, (Oct. 18, 2001).

Ilonen, J, "Keystroke dynamics", Advanced topics in information processing 1—lectures, Lappeenranta University of Technology, Department of Information Technology, (2003), 1-15.

Monrose, F, et al., "Keystroke dynamics as a biometric for authentication", Future Generation Computer Systems, vol. 16, (2000), 351-359.

Peacock, A, et al., "Typing patterns: a key to user identification", IEEE Computer Society, vol. 2, No. 5, (Sep. 2004), 40-47.

Penn State Research Foundation, Inc., EP Extended Search Report dated Oct. 1, 2008 for EP Application No. 05858188.5.

Cotton, Ira W. et al, "Approaches to Controlling Personal Access to Computer Terminals," *Proceeding Computer Networks: Treads & Appos.*, 1975.

Fielding, R., et al., "Hypertext Transfer Protocol—HTTP 1.1", RFC2616 dated Jun. 1999; 177 pages.

"Guidelines on Evaluation of Techniques for Automated Personal ID," U.S. Dept. Of Comm./NBS, FIPS, PUB 48, Apr. 1977.

"Keystroke Dynamics Authentication of Computer Terminal Users," Bioaccess System 2000, 2000A, 2001, 2011, and OEM, Jun. 1984.

Kullback, Solomon, *Information Theory & Statistics*, John Wiley & Sons Inc., pp. 3383, 1959.

Rennick, R.J. et al., "Mufti-A Multi-Function ID System," *WESCON Tech. Papers*, 1975.

Riganati, John P., "An Overview of Electronic ID Systems," *WESCON Tech. Papers*, 1975.

Saltzer, Jerome H. et al., "The Protection of Information in Computer System," *Proceedings of the IEEE*, vol. 63, No. 9, Sep. 1975 (pp. 1278-1308).

Sedgwick, John, "The Body Code Machines: These New Computerized Devices Can Recognize You Anywhere," *This World*, Jan. 9, 1983, pp. 9-10.

Biopassword, Inc., PCT International Search Report dated Jun. 5, 2007, International Application No. PCT/US2006/048964, filed Dec. 20, 2006.

Admitone Security, Inc., Non final office action dated Jun. 2, 2009 for US11/396,786.

Admitone Security, Inc., Non final office action dated Jun. 8, 2009 for US11/317,685.

Admitone Security, Inc., Final Office Action dated Jul. 14, 2009 for US11/349,814.

* cited by examiner

```
// Algorithm to Train Neural Network
TrainNN( KeyVector T[], int nVectors, int UserNum )
{
  WeightVector W = new WeightVector( UserNum );
  double TrainingFactor = EtaTrain0;
  W = T[0];
  for (bool KeepTraining = true; KeepTraining; ) {
    KeepTraining = false;
    for (int i = 0; i < nVectors; ++i) {
      for (int j = 0; j < 69; ++j) {
        double Change = TrainingFactor * (T[i][j] - W[j]);
        W[j] = W[j] + Change;
        if (Change > Error) KeepTraining = true;
      }
    }
    TrainingFactor = TrainingFactor * Alpha;
  }

// Weights trained...now prepare Variability weights

VariabilityVector V = new VariabilityVector( UserNum );
  V.Initialize( 0 );
  for (int i = 0; i < nVectors; ++i) {
    for (int j = 0; j < 69; ++j) {
      double Difference = abs( W[j] - T[i][j] );
      if (Difference > V[j]) V[j] = Difference;
    }
  }
}
```

```
// Algorithm to Classify User bool ClassifyUser( int UserNum, KeyVector G )
{
  WeightVector W = NN.getWeight( UserNum );
  VariabilityVector V = NN.getVariability( UserNum );

double count = 0;
  for (int i = 0; i < 69; ++i) {
    double diff = abs( G[i] - W[i] );
    if (diff <= ScaleFactor * V[i]) count = count + 1;
  }
  if (count / 69 >= PercentSuccess) {
    // Update weights for authenticated user
    for (int i = 0; i < 69; ++i)
      W[i] = W[i] + EtaClassify * (G[i] - W[i]);
    NN.replaceWeight( UserNum, W );
    return true; // User Authenticated
  } else {
    return false; // User Not Authenticated
  }
}
```

Figure 7

SYSTEM AND METHOD FOR CLASSIFYING REGIONS OF KEYSTROKE DENSITY WITH A NEURAL NETWORK

RELATED APPLICATIONS

This application claims the benefit of U.S. Provisional Application No. 60/615,735, filed Oct. 4, 2004.

GOVERNMENT SPONSORSHIP

This work was supported by the United States Army under Contract No. DAAD19-01-1-0504. Accordingly, the U.S. government may have certain rights to this invention.

FIELD

Authenticating Computer Users.

BACKGROUND

Authentication of users is important to prevent unauthorized access to computer systems and networks. Many studies show keystroke dynamics can be used to uniquely identify users. A study, sponsored by National Bureau of Standards in 1980 and conducted by Stanford Research Institute for keystroke-based authentication, reported 98% authentication when the users type in their identifiers and passwords alone. BioPassword Technical Report, BioPassword Keystroke Dynamics, October 2001 (BPTR). In 1980, Rand Corporation concluded the practicality of typewriter keyboard dynamics. Barton and Barton, in 1984, suggested the use of keyboard characteristics in the determination of passwords. In 1985, observations about the keying patterns of telegraph operators showed each operator exhibited a distinct keying pattern. Umphress, D. et al., "Identity Verification Through Keyboard Characteristics", *Int'l Journal of Man-Machine Studies*, 23(3): 263-273, 1985 (Umphress).

Leggett et al., "Verifying Identity via Keystroke Characteristics", *Int'l Journal of Man-Machine Studies*, 28(1): 67-76, 1988 (Leggett), M. Brown et al., "User Identification via Keystroke Characteristics of Typed Names using Neural Networks", *Int'l Journal of Man-Machine Studies*, 39(6): 399-1014, 1993 (Brown), Monrose et al., "Authentication via Keystroke Dynamics", *Proc. of the ACM Workshop*, pp. 48-56, 1997 (Monrose), Robinson et al. "Computer User Verification Using Login String Keystroke Dynamics", *IEEE Transactions on Systems, Man, and Cybernetics-Part A: Systems and Humans*, Vol. 28, No. 2, March 1998, pp. 236-241 (Robinson), Bleha et al., "Computer-Access Security Systems Using Keystroke Dynamics", *IEEE Transactions on Pattern Analysis and Machine Intelligence*, PAMI-12(12): 1217-1222, December 1990 (Bleha) have developed methods based on keystroke dynamics for verification of users with successful results. Gaines et al., "Authentication by Keystroke Timing: Some Preliminary Results", Rand Report R-256-NSF, Rand Corporation, 1980 (Gaines), and U.S. Pat. No. 4,805,222 issued to Young et al. (Young '222) covers user identification based on keystroke dynamics. Products based on keystroke latencies, like BioPassword®, a registered trademark of BioPassword, Inc. of Issaquah, Wash., promise highly accurate authentication based on keystroke latency [BPTR].

U.S. Pat. No. 6,151,593 issued to Cho et al. ("Cho") discusses a keystroke dynamics verification system that uses neural networks to perform verification. "Neural network" ("NN") is a generic term that describes a broad range of data processing schemes. NN methods often show good results when applied to problems of identifying or classifying entities on the basis of noisy, variable, or incomplete data, but many specific NN implementations have drawbacks that make their use inconvenient or impractical in many situations. For example, a multilayer perceptron NN can be trained to distinguish a number of users by their keystroke patterns, but adding a new user to the group or removing an existing user requires that the NN be completely retrained. Other specific NN implementations may have similar difficulties.

SUMMARY

In one embodiment, an authentication system using classifying regions of keystroke density based on a neural network architecture with two types of connections: (1) weight vector W and (2) dispersion or variability vector V is described. Here, W represents users' keystroke pattern, and V represents the radius for the regions of density of users' keystrokes. The system consists of three phases: (1) training, (2) validation, and (3) testing. The system learns W and V during training by, for example, adapting weight vector W to a user's keystroke exemplars and adapting dispersion vector V to variations between the exemplars. Adjustment of parameters such as scale factor ("SF") and percentage success ("PS") is done during validation. During testing, classification results in strengthening the vector W, thereby adapting to changing users' typing patterns. Two measures are used to evaluate classification performance: Imposter Pass Rate ("IPR") and False Authentication Rate ("FAR"). IPR is the ratio of successful impersonation samples over the total impersonation samples. FAR is the ratio of incorrect rejections of authentic samples over total tests with authentic samples. Individual 0% Impostor Pass Rate ("IPR") and 0% False Authentication Rate ("FAR") have been achieved, and overall 1.36% IPR and 2.31% FAR were noted.

BRIEF DESCRIPTION

Embodiments are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

DETAILED DESCRIPTION

An authentication system is described. In one embodiment, the system may be used to authenticate a user of a computer system or network. For example, data may be collected from authorized users of a system or network and used to train a neural network ("NN"), which "learns" to recognize the users. Later, a potential user provides a data sample, and the NN can classify the sample to decide whether the potential user is one of the authorized users.

Data Collection and Processing

In a data collection process, users are asked to select a user identification ("user-id") string and a separate password string. They are also provided with a common string. Users select as their user-id any string with which they are familiar, such as name, email id, etc., because the speed and pattern of typing generally becomes consistent as one types a string repeated a number of times. In the particular embodiment that will be discussed here, the password was restricted to a minimum of six characters, while no minimum length was enforced for user-id. The common string is a well-known, non-secret string that the population of users may be expected to be familiar with typing. For example, in an environment where many of the users are university graduate students, a common string such as "master of science in computer science" might be chosen. In a corporate environment, the name or address of the corporation might be used.

Construction of Input Vector

The timestamp of 'key-press' and 'key-release' of every letter a user types in his user-id, password, and common string is recorded as the reference signature. For example, the reference signature for the substring 'vir' is recorded as "KP V 2937531; KR V 2937640; KP I 2937843; KR I 2937921; KP R 2938156; KR R 2938250;". 'KP' stands for key-press, 'V' is the letter being pressed, and the 2937531 is the timestamp when it was pressed, followed by the delimiter ';'. Similarly 'KR' stands for key-release, 'V' is the letter being released, and the 2937640 is the timestamp when it was released, followed by the delimiter ';'.

Figure 1:
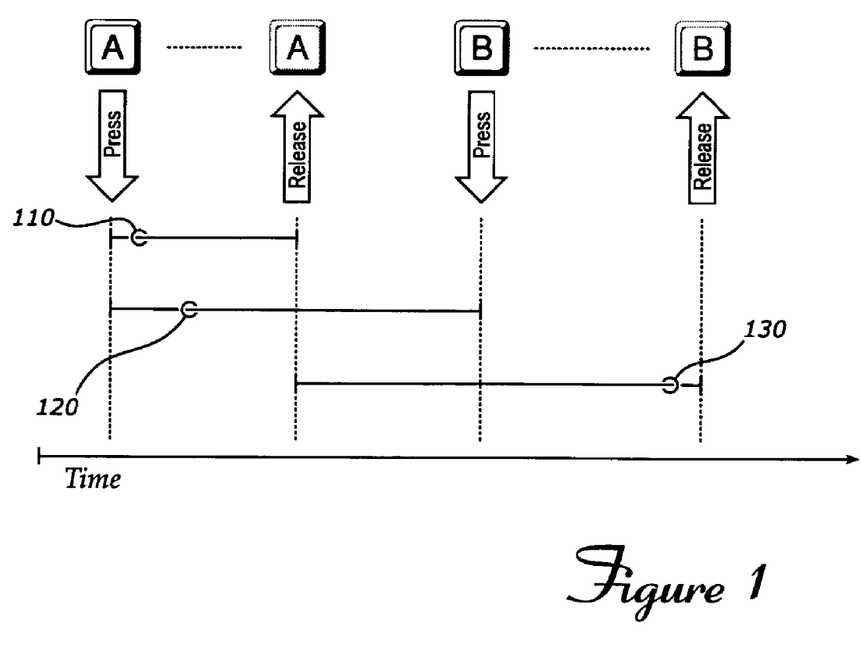
FIG. 1 illustrates events and timing relationships used by embodiments.

From the timestamp of key-press time and key-release time of the characters typed the following three parameters are found: (1) 'key-press time', (2) 'key-latency' between key-press-timestamps, (3) and 'key-latency' between key-release-timestamps. FIG. 1 presents a graphical illustration of the three parameters relative to sequential keystrokes of the "A" and "B" keys: 110 is the duration of the "A" keystroke ("key press time" or "KPT"); 120 is the delay between the start of the "A" keystroke and the start of the "B" keystroke ("key latency—key press time" or "KLKPT"); and 130 is the delay between the end of the "A" keystroke and the end of the "B" keystroke ("key latency—key release time" or "KLKRT").

In one embodiment, not all the KPT, KLKPT, and KLKRT parameters of the reference signatures are used for feeding to the NN. Spaces between words in a user-id, password, or the common string are not considered. Only up to first six characters of a word are considered. For the user-id, seven key latency values are considered. For a single word user-id, the first seven latencies between the first eight characters are considered; for a multi-word user-id, five latencies from the first word and two from the second word are considered. If the latencies fall short of seven latencies due to user-id variation in length, then the last latency is repeated until seven latencies are achieved. For example, in the user-id string "sadeep moorthiyedath", the latencies are "sa, ad, de, ee, ep, mo, oo". For the user-id "vir phoha" the latencies are "vi, ir, ph, ho, oh, ha, ha" (the last latency is repeated to get seven latencies). Since there are KLKPT and KLKRT latencies, 14 latencies are considered, seven from each of KLKPT and KLKRT. For a string of length 'n,' there exist 'n−1' latencies and 'n' key presses. Since a user-id can have two words, in one embodiment, nine key-press times are considered. If the keys fall short of nine key-presses, the last key-press is repeated until nine. From the user-id, 23 keystroke pattern values (nine key-presses and 14 key latencies) are considered.

Since in this embodiment, password length is restricted to a minimum of six characters in this embodiment, each of the six key press times and five key latency times is considered, totaling 16 key pattern values. For the common-string, 'master of science in computer science' nine latencies, the first five latencies from the word 'master', one from 'of', and the first three latencies from 'science' are considered. 12 key-press times, six from 'master', two from 'of', and first four from 'science' are considered. Altogether 30 key patterns are considered in this embodiment.

These different key patterns form a vector of 69 values; which is obtained as follows. In the following, 'uid' means user-id, 'p' means password, and 'cs' means common-string. User id key pattern={uid-KPT, uid-KPKPT, uid-KPKRT} which is of length 23 (9+7+7). Password-key-pattern={p-KP, p-KPKPT, p-KPKRT} which is of length 16 (6+5+5). Common-string-key-pattern={cs-KP, cs-KPKPT, cs-KPKRT} which is of length 30 (12+9+9). The complete key pattern consists of Key pattern vector={uid key-pattern, password-key-pattern, common-string-key-pattern}. This key-pattern vector is of length 69 (23=9+7+7, 16=6+5+5, 30) and forms the input to the NN during training on reference signatures and classification of a user during login.

Key patterns generated by other keypad-like devices may also be used to construct input vectors. For example, the keys of a calculator or adding machine, the sensors of a touch-screen, or the buttons of a telephone may also produce key-down and key-up signals that can be timed and used as an input vector.

Selection of Six Best Representative Vectors

In one embodiment, six vectors for use in training the classifying NN are selected from nine candidate reference signatures produced by a user typing his user-id, password, and common string as follows. A NN with a one dummy output node is trained on all nine reference vectors. The algorithm for training the dummy NN weights is identical to the algorithm described below with reference to FIGS. 3, 4 and 5. The Euclidean distance between each input vector X and the weight vector of the dummy NN $W_{dummy}$ is calculated and the six closest input vectors are chosen, that is the six vectors which have the smallest Euclidean distance. This implies considering those candidate reference signature that have less degree of variability among themselves. These six candidate vectors then form the inputs to the NN for training a new output node to identify the user.

Figure 2:
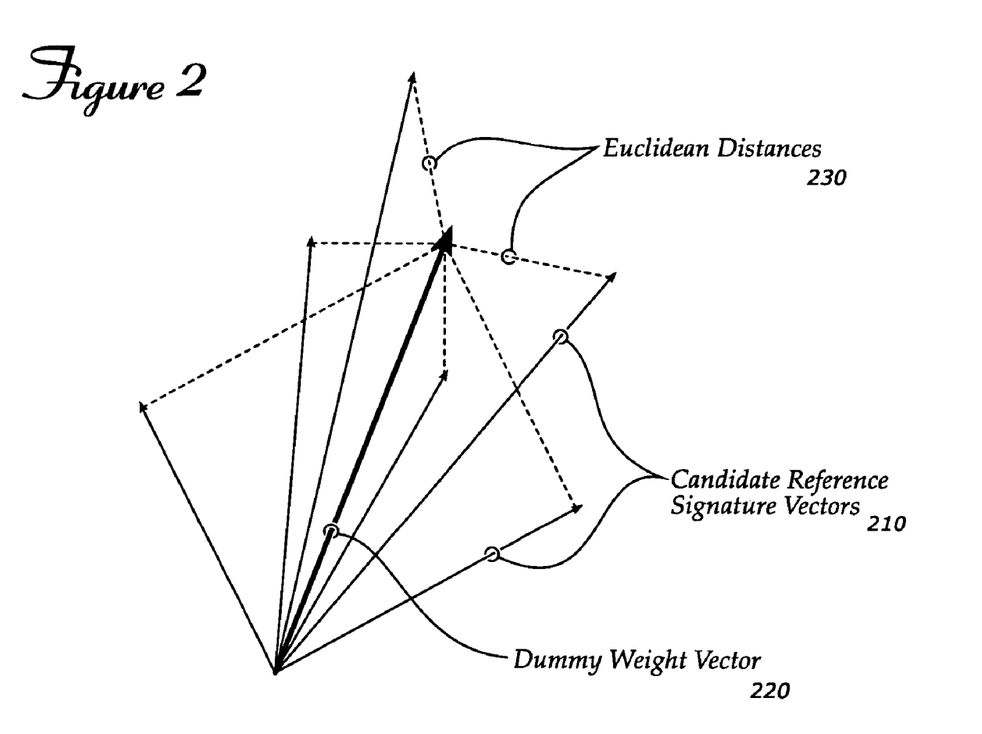
FIG. 2 illustrates the selection of the best training vectors from among a set of candidate vectors.

FIG. 2 shows a number of candidate reference signature vectors 210 and the dummy weight vector 220 that results from training the dummy NN on the candidate vectors. Euclidean distances between the candidate vectors and the dummy weight vector are indicated with dashed lines, several of which are identified as Euclidean distances 230. Note that the reference vectors and the weight vector are, in this embodiment, 69-dimensional vectors, so FIG. 2 is necessarily simplified. However, the extension of the ideas shown in FIG. 2 to the actual, 69-dimensional case, is straightforward.

Neural Network Architecture

Figure 3:
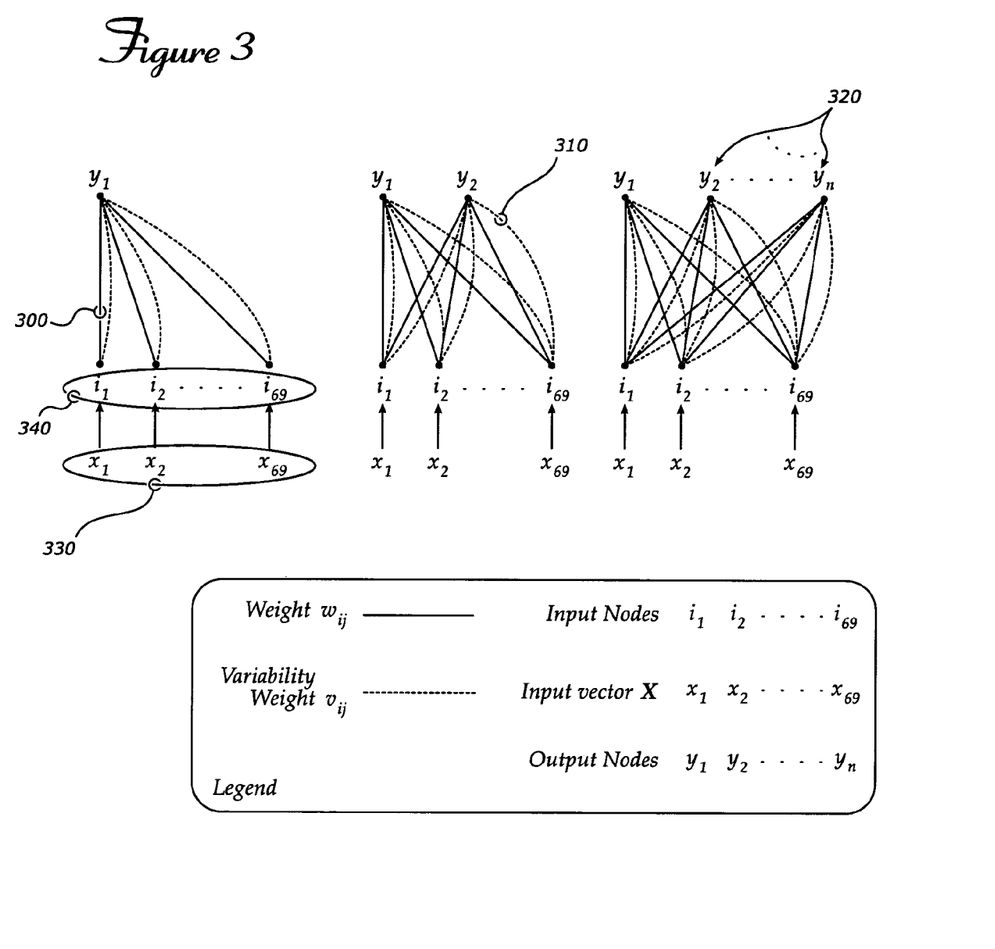
FIG. 3 shows connections between elements of an input vector and one or more output vectors.

In one embodiment, the NN is a two-layered network with 69 input nodes ($i_1$ through $i_{69}$) and n output nodes ($y_1$ through $y_n$). Each output node corresponds to one user. Every input node is connected to every output node via weights $w_{ij}$, where i is the number of the input node and j is the number of the output node. Addition (or deletion) of users does not affect other users.

The weight vector $W_j = \{w_{1j}, w_{2j}, \ldots, w_{69,j}\}$ consists of all the weights connecting the input nodes to the output node j. Apart from the weights, every input node is connected to every output node via variability-weights $V_j = \{v_{1j}, v_{2j}, \ldots, v_{69,j}\}$. Variability-weight $v_{ij}$ connects $i^{th}$ output node to $j^{th}$ output node, and vector $V_j$ consists of the variability-weights connecting all input nodes to output node j. The input vector X has 69 components, as discussed above. One output node is assigned per user, and additional output nodes can be added when new users register with the system. FIG. 3 shows the weights 300 and variability weights 310 connecting the input nodes $i_1$ through $i_{69}$ to output nodes $y_1$ through $y_n$ 320. Element 330 shows the 69 components of input vector X ($x_1$ through $x_{69}$) being input to input nodes 340. Note that each output node $y_j$ has its own set of weights $w_{1,j}$ through $w_{69,j}$ and variability weights $v_{1,j}$ through $v_{69,j}$, and there are no connections directly between output nodes. This arrangement makes each output node independent of every other, so that an output node may be deleted, or a new node added, without affecting any other output node. This property permits users to be added and deleted at any time.

Figure 4:
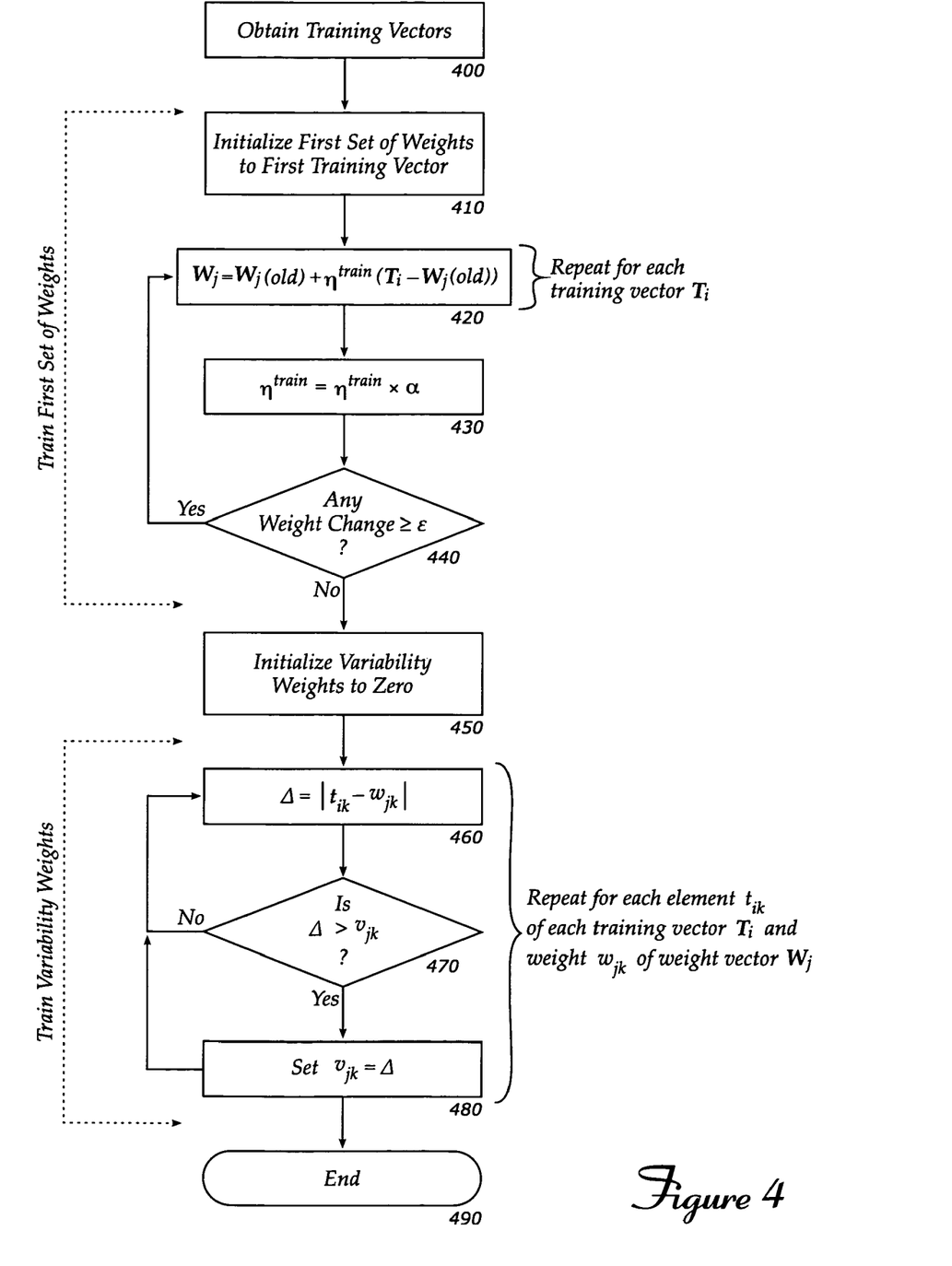
FIG. 4 is a flowchart illustrating the process of training the neural network to identify a new user.

FIG. 4 shows how the neural network can be trained to recognize a new user according to an embodiment. First, a set of training vectors is obtained (400). In some embodiments, a first group of candidate training samples is collected, then a low-variability subset is selected for use in training (as discussed in paragraph [0022]). In other embodiments, all of the collected training samples may be used.

Next, the set of weights connecting the inputs $i_1$ through $i_{69}$ to output $y_j$, the output to be trained for the new user, is initialized to the elements of the first training vector $T_1$ (410). Then, for each training vector $T_k$, where k is an integer from 1 to the total number of training vectors, weight vector $W_j$ is updated according to the equation:

$$W_j = W_j(\text{old}) + \eta^{train}(T_k - W_j(\text{old})) \quad \text{(Eq. 1)}$$

(see block 420).

After each training vector has been processed, the learning factor $\eta^{train}$ is decreased by $\alpha$ (430). Then, if any weight $w_{ij}$ changed by more than a predetermined error factor $\epsilon$ (440), training is repeated for each vector with the decreased learning factor. After one or more iterations, weights $W_j$ will be trained and the second phase of training can begin. This portion of the algorithm (operations 400 through 440) is also used to train the weights in the dummy NN, as mentioned above.

Variability weight training begins with initializing all variability weights $v_{ij}$ to zero (450). Then, for each element $t_{ik}$ of training vector $T_k$ and weight $w_{ij}$ of weight vector $W_j$, the difference $\Delta = |t_{ik} - w_{ij}|$ is computed (460). If the difference is greater than the corresponding variability weight $v_{ij}$ (470), $v_{ij}$ is updated to the computed difference (480). In effect, $v_{ij}$ is set to the largest difference between $t_{ik}$ and $w_{ij}$, where N is the total number of the training vectors:

$$v_{ij} = \max_{k=1,N} |t_{ik} - w_{ij}| \quad \text{(Eq. 2)}$$

Figure 5:
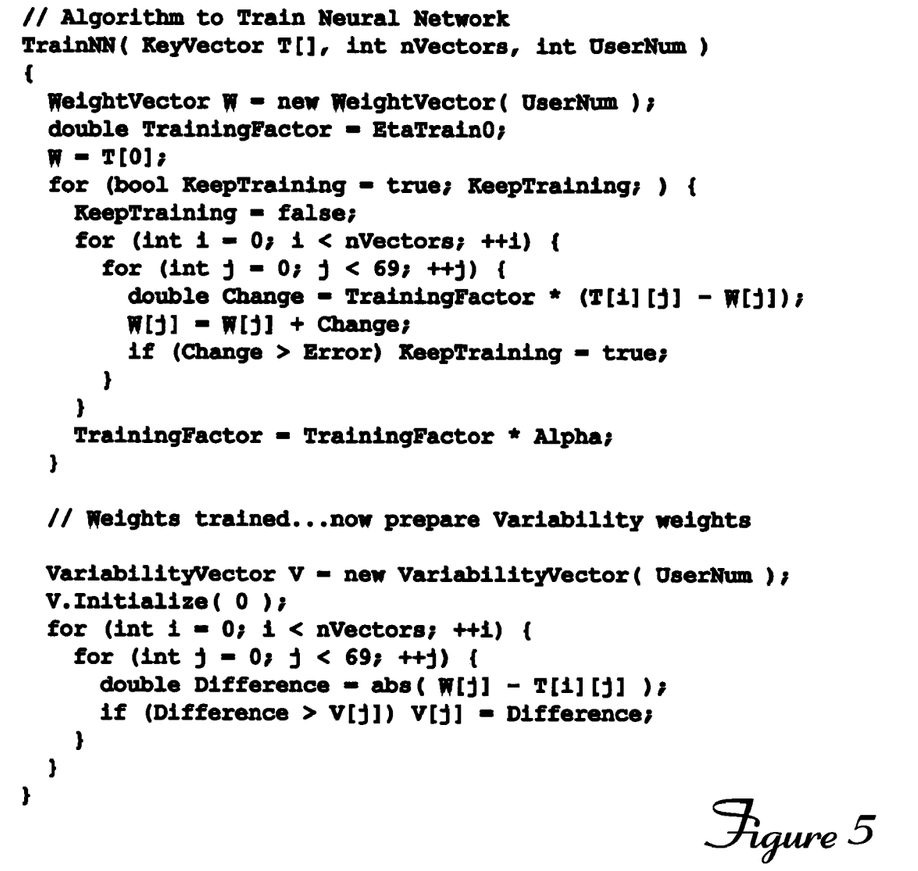
FIG. 5 presents pseudo-code to implement the method.

When every element of each training vector has been processed, variability weight training is complete (490). FIG. 5 presents an implementation of this algorithm as pseudo-code.

Figure 6:
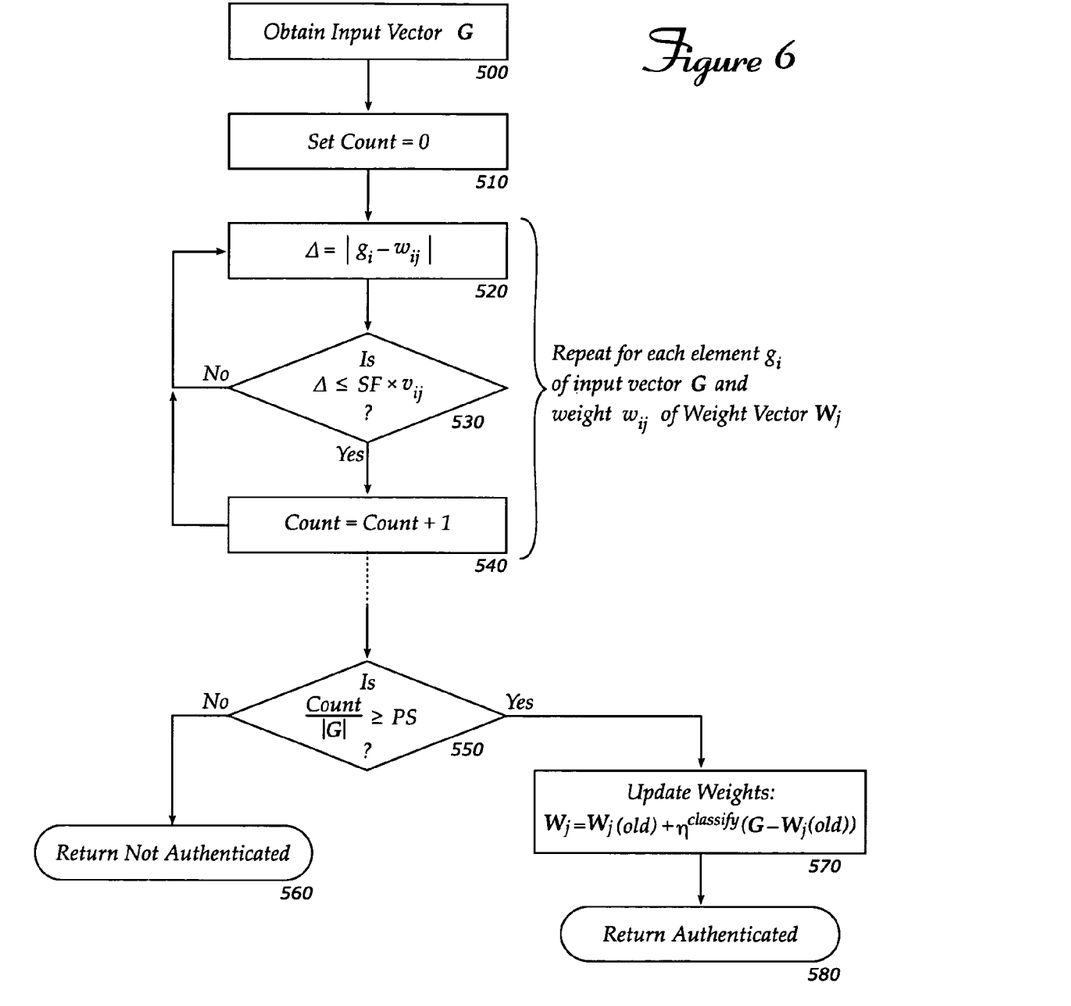
FIG. 6 is a flowchart illustrating the process of classifying an input vector to determine whether it was made by a known user.

FIG. 6 shows how the neural network trained as described above can be used to classify an input vector obtained from a prospective user. During classification, a single vector G is obtained from the prospective user (500) and forms the input. A counter variable is initialized to zero (510), then for each element $g_i$ of input vector G and weight $w_{ij}$ of weight vector $W_j$, the difference $\Delta = |g_i - w_{ij}|$ is computed (520). If $\Delta$ is less than or equal to a predetermined scale factor SF multiplied by the corresponding variability weight $v_{ij}$ (530), the counter is incremented (540).

Figure 7:
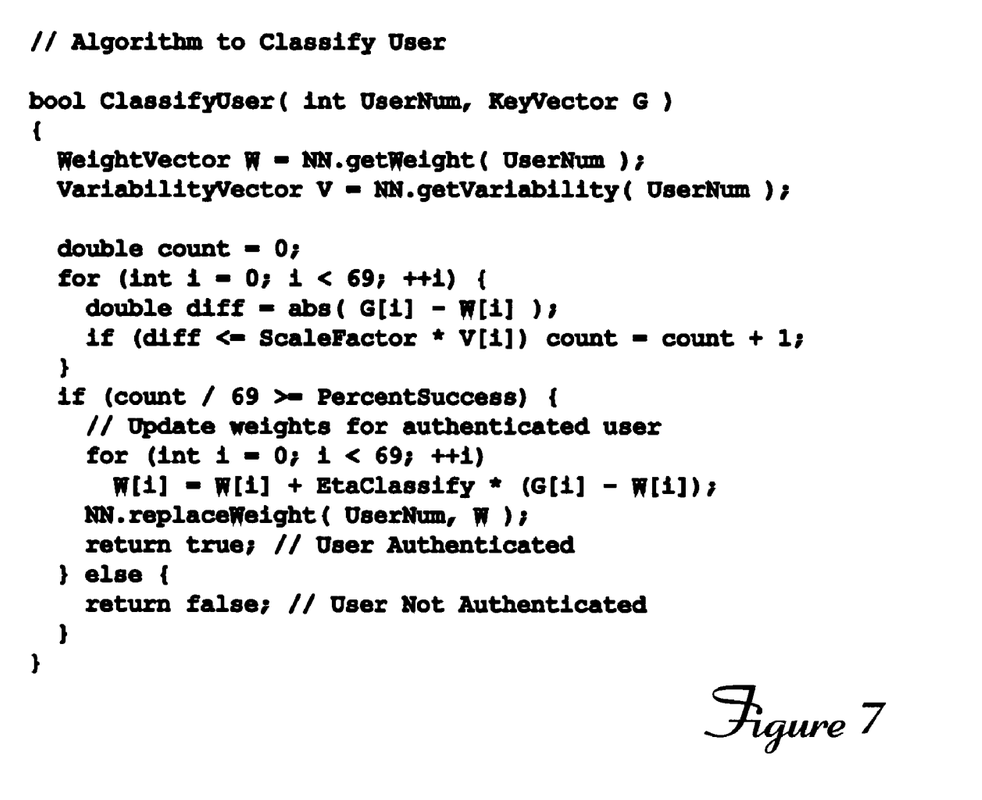
FIG. 7 presents pseudo-code to implement the method.

Once each element $g_i$ and weight $w_{ij}$ has been processed, the total count divided by the number of elements in G is compared to a second predetermined value, Percentage Success (PS) (550). (Note that count/|G| is the ratio of input elements of G that were within a range of SF×$v_{ij}$ of $w_{ij}$ to total input elements of G). If the ratio is less than PS, the prospective user is not authenticated as the user corresponding to output $y_j$ of the neural network (560). If the ratio is greater than or equal to PS, the prospective user is successfully authenticated, so the corresponding weight vector $W_j$ is updated by a learning factor $\eta^{classify}$ (570) and the classifier returns a successful authentication (580). FIG. 7 shows a pseudo-code implementation of the foregoing classification method.

The classification procedure may alternately be described by the following equations. A classification vector C containing elements $c_i$ is calculated according to the following equation:

$$c_i = \begin{cases} 1 & \text{if } |g_i - w_{ij}| < SF \times v_{ij} \\ 0 & \text{otherwise} \end{cases} \quad \text{(Eq. 3)}$$

Once C is prepared, output $y_j$ of the NN is given by:

$$y_j = \begin{cases} 1 & \text{if } \frac{|G|}{69} \geq PS \\ 0 & \text{otherwise} \end{cases} \quad \text{(Eq. 4)}$$

The scale factor SF signifies the amount of variability to be allowed in a user's typing pattern during classification. A higher value allows more variability in user's typing pattern, but also increases the chances of successful impersonation. A lower value indicates tightened typing behavior, requiring the keystrokes to be the same as entered in training.

The prospective user is successfully classified if his percentage of 'pattern matches' is greater than a preset value of 'percentage-success' (PS). That is, if the 'percentage-success' is set to be 90%, then the user's total individual pattern matches ($g_i$ with scaled $v_{ij}$) must be 90% or greater. This factor allows the tightening of security of the system. A higher value results in lesser error but increases FAR. A lower value reduces the FAR while increasing error.

EXAMPLE

A total of 43 users took part in providing reference signatures. Apart from providing reference signatures for training the NN, every user participated in providing login samples and impersonating others. A total of 873 login samples were collected, out of which 216 samples were authentic samples—users trying to login providing correct user-id and passwords, and 657 imposter samples—users trying to impersonate others. Two measures were used during classification, Imposter Pass Rate (IPR) and False Authentication Rate (FAR). IPR is the ratio of successful impersonation samples over the total impersonation samples. FAR is the ratio of wrong rejection of authentic samples over total authentic samples.

Table 1 shows IPR and FAR as SF and PS are varied. IPR increases, as SF and PS are increased; FAR decreases faster when PS is reduced. The optimal result we get is an IPR of 1.36% (9 out of 657 samples) and an FAR of 2.31% (5 out of 216 samples). The best result is 0% IPR with least possible FAR. An ideal situation is to have minimum IPR with minimum FAR. In this example, 0% IPR with 60% FAR was achieved. For an IPR of 0.3% (2 errors out of 657) FAR is 18.5% (40 out of 216). SF and PF varied from 0.1 to 3.0 in increments of 0.1 and validated the results during validation phase.

TABLE 1

Varying results of IPR and FAR with PS and SF varied at $\eta^{classify} = 0.001$, $\eta^{train} = 0.4$, and $\alpha = 0.5$

|         | SF   |       |       |       |       |       |       |       |       |
|---------|------|-------|-------|-------|-------|-------|-------|-------|-------|
|         | 1.5  | 1.75  | 2.0   | 2.3   | 3.0   | 1.5   | 1.5   | 1.5   | 1.5   |
| PS      | 0.9  | 0.9   | 0.9   | 0.9   | 0.9   | 0.85  | 0.8   | 0.75  | 0.7   |
| IPR (%) | 0    | 0     | 0.15  | 0.15  | 1.21  | 0.15  | 0.15  | 1.06  | 2.28  |
| FAR (%) | 89.9 | 73.61 | 49.53 | 38.88 | 12.5  | 56.01 | 36.11 | 7.87  | 2.31  |

Table 2 shows the results with different combinations of user-id, password, and common string. Having a common-string and considering KPT, KLKPT, KLKRT decreases IPR with better FAR rates. Considering user-id, password, and common-strings with KP, KLKPT, and KLKRT yield better results for the same set of optimal parameters.

TABLE 2

IPR and FAR for different types of experiments with parameters SF = 1.9, PS = 0.77, $\eta^{classify} = 0.001$, $\eta^{train} = 0.4$, and $\alpha = 0.6$

| Experiment Type | Name, password, and Common-string | Name and password only | Name and password (KLKRT) | Name, Password, common-string (KLKRT) |
|---|---|---|---|---|
| IPR (%) | 1.36 | 2.13 | 4.41 | 3.19 |
| FAR (%) | 2.31 | 18.98 | 29.62 | 14.35 |

Table 3 compares the example results with the results of other methods.

It is appreciated that keystroke input vectors may be collected at various times, including during the sign-in or login process, or when a user is issuing commands and working with applications on the computer system.

An embodiment may be a machine-readable medium having stored thereon instructions that cause a processor to perform operations as described above. In other embodiments, the operations might be performed by specific hardware components that contain hardwired logic. Those operations might alternatively be performed by any combination of programmed computer components and custom hardware components.

A machine-readable medium may include any mechanism for storing information in a form readable by a machine (e.g., a computer), including but not limited to Compact Disc Read-Only Memory (CD-ROMs), Read-Only Memory (ROMs), Random Access Memory (RAM), and Erasable Programmable Read-Only Memory (EPROM).

The applications have been described largely by reference to specific examples and in terms of particular allocations of functionality to certain hardware and/or software components. However, those of skill in the art will recognize that user authentication by classifying regions of keystroke density with a neural network can also be produced by software and hardware that distribute the functions of embodiments differently than herein described. Such variations and implementations are understood to be apprehended according to the following claims.

We claim:

1. A method comprising:
    obtaining, by a computing system, a plurality of training vectors, each to contain a plurality of keystroke pattern values derived from keystrokes entered by a user;
    adding, by the computing system, a new output node to a neural network, the new output node corresponding to the user and connected directly to each of a plurality of

TABLE 3

Comparison of results with other existing methods.

| Method | | This Example | J. Leggett and G. Williams Leggett | S Bleha, et al. Bleha | J. Leggett et al. | D. Umpress and G. Williams Umpress | M. Brown and S. Rogers Brown | R. Joyce and G. Gupta Joyce[1] |
|---|---|---|---|---|---|---|---|---|
| Best result | IPR (%) | 0.3 (2 of 657) | — | — | — | — | 0 | 0 |
|  | FAR (%) | 18 | — | — | — | — | 12 | 40 |
| Optimal Result | IPR (%) | 1.36 (9 of 657) | 2.7 | 2.8 | 5 | 6 | — | 0.25 |
|  | FAR (%) | 2.31 | 12.2 | 8.1 | 5.5 | 12 | — | 16.36 |

[1]Joyce, R., et al., "Identity Authentication Based on Keystroke Latencies", Comm. of the ACM, Vol. 33, No. 2, pp. 168-176, February 1990 (Joyce).

input nodes by an element of a first weight vector and connected directly to each of the plurality of input nodes by an element of a second weight vector;

training, by the computing system, the first weight vector connecting the input nodes to the new output node with the plurality of training vectors, wherein training the first weight vector includes updating the first weight vector in multiple iterations, in each iteration the first weight vector is subtracted from one of the training vectors and multiplied by a learning factor that decreases after each iteration; and after completion of training the first weight vector, training, by the computing system, the second weight vector, wherein each element of the second weight vector is obtained by computing a difference between a corresponding element of a training vector and a corresponding element of the first weight vector, repeating computation of the difference for each of the training vectors, and determining a largest difference among the computed differences, wherein each element of the second weight vector is to be scaled by a scale factor to define a range for an element of an input vector to be classified, the range is to be compared with a difference between a corresponding element of the first weight vector and a corresponding element of the input vector, and the number of elements of the input vector that are within respective ranges is to be counted to classify the input vector.

2. The method of claim 1, further comprising:

constructing a plurality of candidate vectors, each to contain a plurality of keystroke pattern values derived from keystrokes entered by the user; wherein a number of candidate vectors is at least as large as a number of training vectors; and a subset of the plurality of candidate vectors is selected to be the plurality of training vectors.

3. The method of claim 2, further comprising:

training a dummy neural network with the plurality of candidate vectors;

ordering the plurality of candidate vectors based on a Euclidian distance between each candidate vector and a weight vector of the dummy neural network; and selecting a subset of the ordered candidate vectors to be the plurality of training vectors; wherein a Euclidian distance between each selected candidate vector and the weight vector of the dummy neural network is less than a Euclidian distance between every non-selected candidate vector and the weight vector of the dummy neural network.

4. The method of claim 2 wherein a number of training vectors is six (6) per user.

5. The method of claim 1 wherein training the first weight vector comprises:

initializing the first weight vector to a first of the plurality of training vectors; and for each of the remaining training vectors, updating the first weight vector according to the equation:

$$W_j = W_j(\text{old}) + \eta^{train}(T_k - W_j(\text{old}))$$

where j is an index of the new output node, $W_j$ is the first weight vector connecting the inputs of the neural network to the new output node, $T_k$ is an input vector, where k is an integer in the range of 1 to the total number of the training vectors, and $\eta^{train}$ is a learning factor.

6. The method of claim 1 wherein training the second weight vector comprises:

setting $$v_{ij} = \max_{k=1,N} |t_{ik} - w_{ij}|$$

where i is an index of an input node, j is an index of the new output node, $v_{ij}$ is an element of the second weight vector connecting an $i^{th}$ input node to the new output node, k is an index of a training vector, $t_{ik}$ is an $i^{th}$ element of the $k^{th}$ training vector, N is the total number of the training vectors, and $w_{ij}$ is an element of the first weight vector connecting the $i^{th}$ input node to the new output node.

7. The method of claim 1 wherein adding the new output node and training the first and second weight vectors connecting the inputs to the new output node do not affect any existing output nodes of the neural network.

8. The method of claim 1 wherein the new output node is assigned to the user.

9. A method comprising:

constructing, by a computing system, an input vector containing a plurality of keystroke pattern values derived from keystrokes entered by a user;

calculating, by the computing system, a classification vector, each element of the classification vector to contain a value derived from a corresponding element of the input vector, a corresponding element of a first weight vector of a neural network, and a corresponding element of a second weight vector of the neural network, the neural network having an output node directly connected to an input node; and computing, by the computing system, a pattern match value from the classification vector, wherein the first weight vector has been trained by updating the first weight vector in multiple iterations, in each iteration the first weight vector is subtracted from one of a plurality of training vectors and multiplied by a learning factor that decreases after each iteration, each element of the second weight vector has been obtained, after completion of training the first weight vector, by computing a difference between a corresponding element of a training vector and a corresponding element of the first weight, repeating computation of the difference for each of the training vectors, and determining a largest difference among the computed differences, and wherein computing a pattern match value comprises:

scaling each element of the second weight vector by a scale factor to define a range for an element of an input vector to be classified;

comparing the range with a difference between a corresponding element of the first weight vector and a corresponding element of the input vector; and counting the number of elements of the input vector that are within respective ranges.

10. The method of claim 9, further comprising:

comparing the pattern match value to a predetermined value; and if the pattern match value equals or exceeds the predetermined value, declaring a successful classification of the user.

11. The method of claim 10, further comprising:
if the user is successfully classified, updating the first and second weight vectors of the neural network.

12. The method of claim 9 wherein calculating a classification vector comprises:
for each element of the input vector, setting a corresponding element of the classification vector according to the equation:

$$c_i = \begin{cases} 1 & \text{if } |g_i - w_{ij}| < SF \times v_{ij} \\ 0 & \text{otherwise} \end{cases}$$

wherein $c_i$ is an element of the classification vector, $g_i$ is an element of the input vector, $w_{ij}$ is an element of the first weight vector, $v_{ij}$ is an element of the second weight vector, and SF is the scale factor.

13. The method of claim 9 wherein the pattern match value is a ratio of elements of the classification vector that are within a predetermined range of a corresponding first weight to a total number of elements of the classification vector.

14. A computer-readable medium storing instructions that, when executed by a processor, cause the processor to perform operations comprising:
recording a plurality of candidate reference signatures;
selecting a plurality of training signatures from the plurality of candidate reference signatures;
training a first set of weights of a neural network with the plurality of training signatures, the first set of weights connecting input nodes of the neural network to an output node, wherein training the first set of weights includes updating the first set of weights in multiple iterations, in each iteration the first set of weights is subtracted from one of the training vectors and multiplied by a learning factor that decreases after each iteration; and
training a second set of weights of the neural network with the plurality of training signatures, the second set of weights connecting the input nodes to the output node, each element of the second set of weights obtained by computing a difference between a corresponding element of a training vector and a corresponding element of the first set of weights, repeating computation of the difference for each of the training vectors, and determining a largest difference among the computed differences,
wherein each element of the second set of weights is to be scaled by a scale factor to define a range for an element of an input vector to be classified, the range is to be compared with a difference between a corresponding element of the first set of weights and a corresponding element of the input vector, and the number of elements of the input vector that are within respective ranges is to be counted to classify the input vector.

15. The computer-readable medium of claim 14 wherein selecting comprises:
training a set of weights of a dummy neural network with the plurality of candidate reference signatures; and
selecting as the plurality of training signatures a subset of the candidate reference signatures that have a smaller Euclidean distance to the set of weights of the dummy neural network than any non-selected candidate reference signature.

16. A computer-readable medium storing instructions that, when executed by a processor, cause the processor to perform operations comprising:
obtaining an input vector containing keystroke parameters from a prospective user;
computing a difference between each element of the input vector and a corresponding element of a first weight vector of a neural network that has an output node directly connected to an input node;
comparing the difference to a product of a corresponding element of a second weight vector of the neural network multiplied by a predetermined scale factor;
in response to a determination that the difference is less than the product, incrementing a counter;
processing all of the elements of the input vector, determining the value of the counter; and
if the value divided by a total number of elements of the input vector equals or exceeds a predetermined value, authenticating the prospective user as a user corresponding to an output of the neural network,
wherein the first weight vector has been trained by updating the first weight vector in multiple iterations, in each iteration the first weight vector is subtracted from one of a plurality of training vectors and multiplied by a learning factor that decreases after each iteration, and
each element of the second weight vector has been obtained, after completion of training the first weight vector, by computing a difference between a corresponding element of a training vector and a corresponding element of the first weight, repeating computation of the difference for each of the training vectors, and determining a largest difference among the computed differences.

17. The computer-readable medium of claim 16, further comprising instructions to cause the processor to update the first weight vector of the neural network according to an equation:

$$W_j = W_j(\text{old}) + \eta^{classify}(G_k - W_j(\text{old}))$$

where $W_j$ is the first weight vector of the neural network, $W_j(\text{old})$ is the first weight vector of the neural network before it is updated, $\eta^{classify}$ is a classification factor, $G_k$ is an element of the input vector, where k is an integer in the range of 1 to the total number of elements in the input vector.

18. The computer-readable medium of claim 16, wherein the scale factor signifies the amount of variability to be allowed in a user's typing pattern during classification.

* * * * *

UNITED STATES PATENT AND TRADEMARK OFFICE
CERTIFICATE OF CORRECTION

PATENT NO. : 7,620,819 B2  Page 1 of 1
APPLICATION NO. : 11/241103
DATED : November 17, 2009
INVENTOR(S) : Phoha et al.

It is certified that error appears in the above-identified patent and that said Letters Patent is hereby corrected as shown below:

In Column 1, in Government Sponsorship, please delete

"This work was supported by the United States Army under Contract No. DAAD19-01-1-0504. Accordingly, the U.S. government may have certain rights to this invention."

and insert

-- This invention was made with government support under Grant No. DAAD19-01-1-0504, awarded by the U.S. Army/ARL. The Government has certain rights in the invention. --

Signed and Sealed this

Twentieth Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,620,819 B2
APPLICATION NO. : 11/241103
DATED : November 17, 2009
INVENTOR(S) : Phoha et al.

It is certified that error appears in the above-identified patent and that said Letters Patent is hereby corrected as shown below:

Title page in Item (75) Inventors, line 2, please delete "Shreveport" and insert -- Ruston --
Title page in Item (75) Inventors, line 4, please delete "Phoba" and insert -- Phoha --

Signed and Sealed this

Twenty-seventh Day of April, 2010

David J. Kappos
*Director of the United States Patent and Trademark Office*